Sept. 17, 1940.　　　M. PLATZNER　　　2,215,157
POWER GENERATION
Filed May 23, 1938　　　2 Sheets-Sheet 1
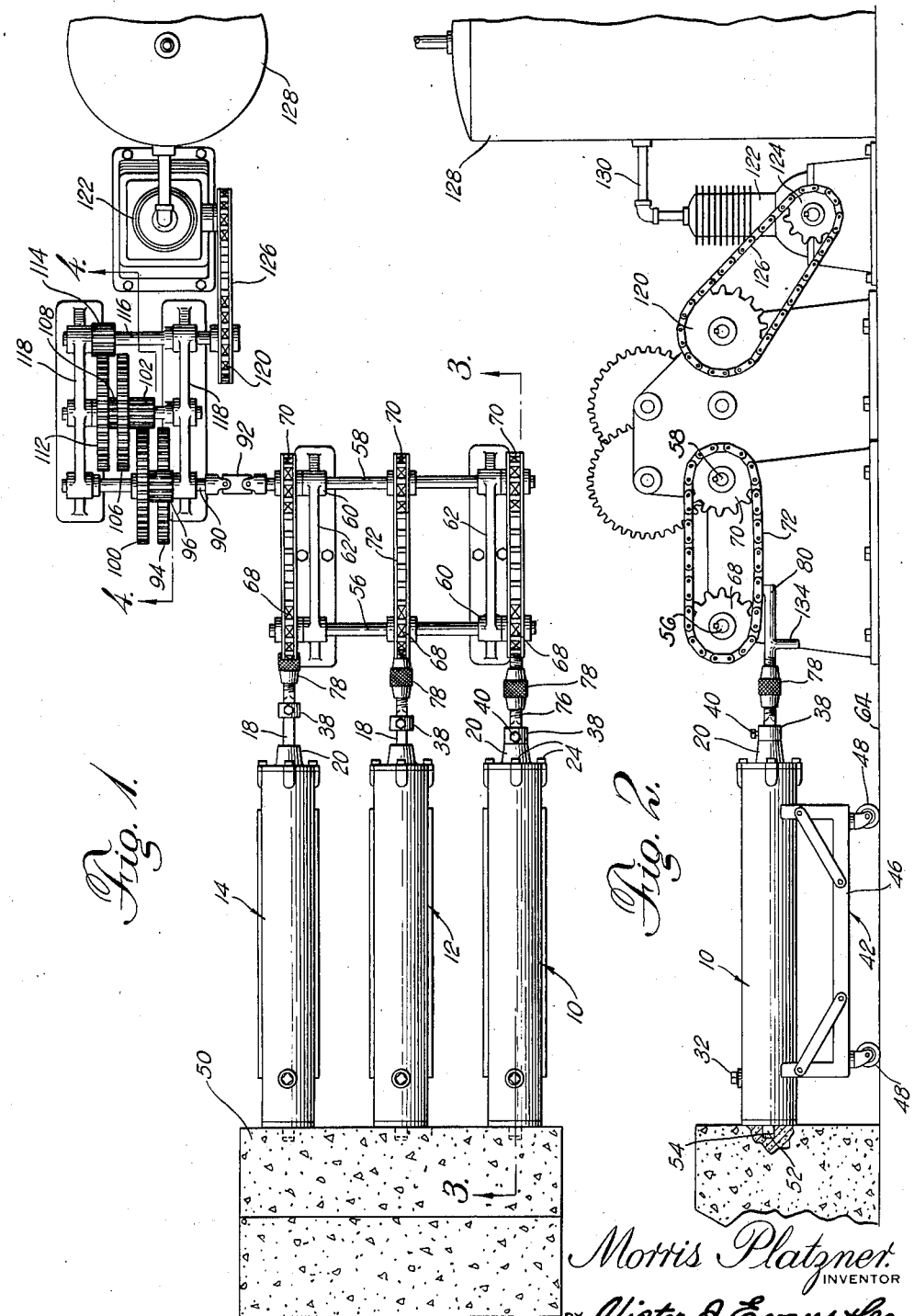
Morris Platzner,
INVENTOR
BY Victor J. Evans & Co.
HIS ATTORNEYS Sept. 17, 1940.     M. PLATZNER     2,215,157
POWER GENERATION
Filed May 23, 1938     2 Sheets—Sheet 2
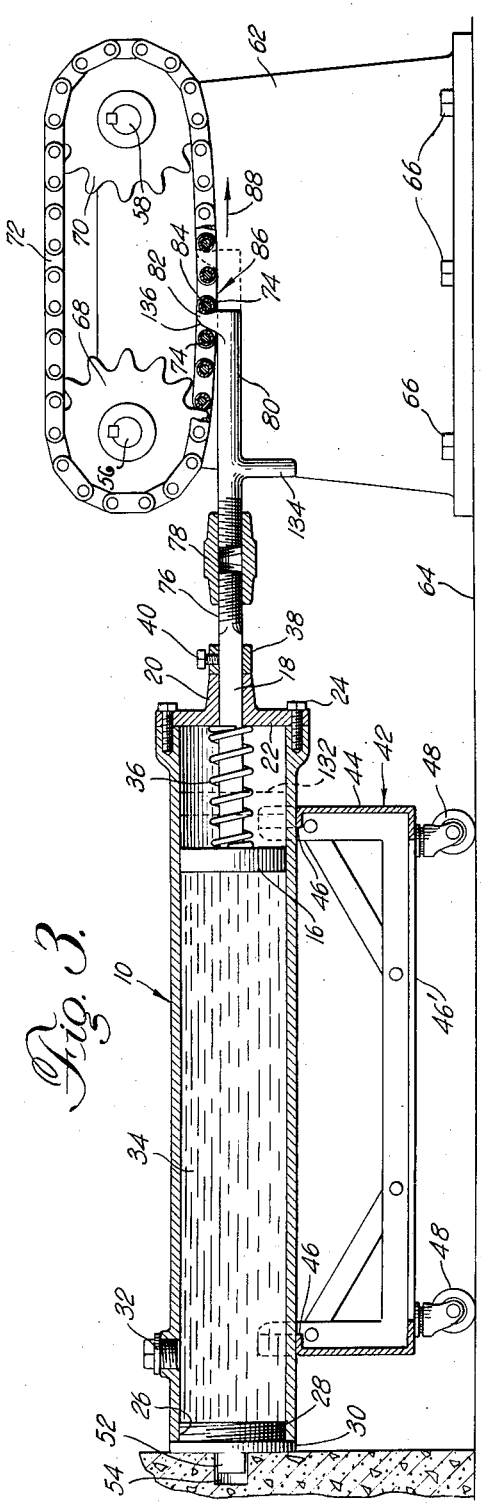
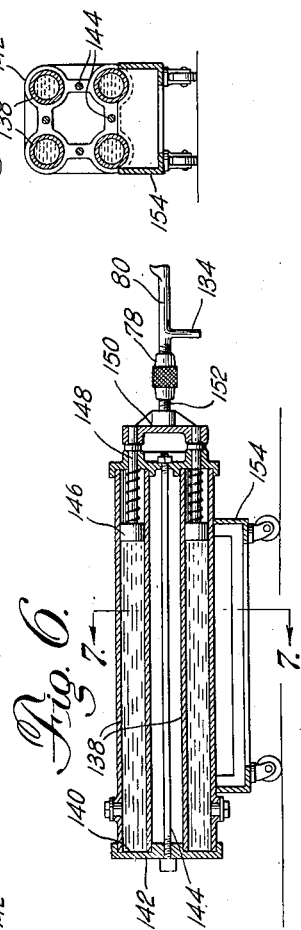
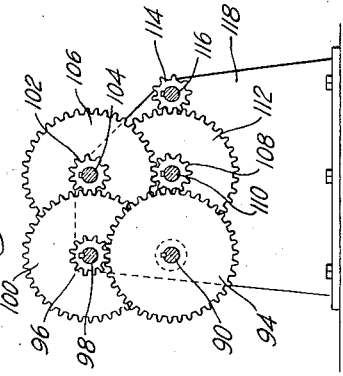

Patented Sept. 17, 1940

2,215,157

UNITED STATES PATENT OFFICE 2,215,157

POWER GENERATION

Morris Platzner, Chicago, Ill.

Application May 23, 1938, Serial No. 209,569

1 Claim. (Cl. 60—23)

My invention relates to the generation of power and includes among its objects and advantages a novel system designed to utilize the expansive force of freezing water or other liquids in such a manner as to perform useful work.

An object of my invention is to provide a power generating system designed to utilize the enormous expansive forces of freezing water in which novel means are employed for rendering such expansive forces effective for performing useful work.

Another object is to provide a system of the type described in which a plurality of power units utilizing the expansive force of freezing liquids for generating power may be successively connected with a power take-off and in which the power units may be chilled by normal atmospheric temperatures, thereby eliminating the necessity for specially designed freezing equipment.

A further object is to provide a system of the type described in which a plurality of power units may be successively connected with a power take-off and in which the units are of a portable nature to facilitate charging with liquid to be frozen as well as removal of the frozen liquid from the unit at a point remote from the power take-off.

In the accompanying drawings:

Fig. 1 is a diagrammatic top plan view of a power system embodying my invention;

Fig. 2 is a side elevational view;

Fig. 3 is an enlarged sectional view along the line 3—3 of Fig. 1;

Fig. 4 is a view taken from the position indicated by line 4—4 of Fig. 1;

Fig. 5 is a plan view of a different form of power unit;

Fig. 6 is a sectional view along the line 6—6 of Fig. 5; and

Fig. 7 is a sectional view along the line 7—7 of Fig. 6.

In the embodiment selected to illustrate my invention, I make use of a plurality of power cylinders 10, 12 and 14. These cylinders are identical in construction and operation so that any description of one hereafter will apply to all. In Fig. 3, the power cylinder 10 includes a slidable piston 16 connected with a rod 18 which is rectangular in cross section and slidably supported within the bearing 20. Bearing 20 is in the nature of a box formed integrally with a closure plate 22 connected with one end of the cylinder by bolts 24. The opposite end of the cylinder 10 is internally threaded at 26 for the reception of the threaded plug 28 having a flange 30 arranged to engage the end of the cylinder for closing purposes. A screw plug 32 is employed to facilitate filling of the cylinder with water or other liquid, indicated at 34.

The water chamber in the cylinder 10 constitutes the space between the piston 16 and the closure plug 28. Fig. 3 illustrates the normal position of the piston 16 at the time the cylinder 10 is supplied with water preparatory to freezing the same. The cylinder is preferably charged with water at its greatest density, and the expansive force of the water in freezing is transmitted to the piston 16 for urging the same in the direction of the plate 22, which movement imparts outward movement of the rod 18. In the normal position of Fig. 3, the piston 16 is spaced from the plate 22 sufficiently far to accomodate movement of the piston in response to the expansive forces of the freezing water. Upon the rod 18, I mount a compression spring 36 which is arranged in abutting relation with the piston 16 and the plate 22. Spring 36 is of sufficient stiffness to normally hold the piston 16 in the normal position of Fig. 3 against the pressure forces of the water 34 when poured in the cylinder. A collar 38 is fixedly secured on the rod 18 by a set screw 40, which collar engages the bearing or boss 20 to prevent the spring 36 from urging the piston 16 inwardly of the cylinder 10 beyond the normal position of Fig. 3, as when charging the cylinder with water.

Figs. 2 and 3 illustrate the construction of the trucks 42 which support the cylinders 10, 12 and 14. According to Fig. 3, the truck 42 may comprise end walls 44 flanged and depressed at 46 to provide curvatures which partly embrace the cylinder 10. End walls 44 may be welded to the frame structure 46', and the latter is provided with casters 48 which facilitate movement of the unit which in large installations may embody considerable weight. Cylinder 10 may be welded to the flanges 46.

In providing trucks for the cylinders 10, 12 and 14, the cylinders may be charged with water at a point remote from the operating system. At the same time, after the water in the cylinders is frozen solid, the units may be conveyed to a dump, and the ice removed therefrom. In removing the ice, the plugs 28 may be unscrewed from their respective cylinders, and the application of heat to the cylinders will loosen the ice within a short period of time. After loosening the ice, it is easily removed by tilting the cylinders at a slight angle, at which time the ice will drop out of its own weight. Heat may be applied to the cylinders by storing the same in a heated room or bathing the same in warm water.

Referring to Fig. 1, the cylinders 10, 12 and 14 are arranged in parallel and spaced relation, and their rear ends are positioned in abutting relation with a heavy abutment 50 having sufficient strength to resist the expansive forces of the freezing water so that such expansive forces are applied to the pistons 16 and, in turn, to the rods 18. To facilitate quick and easy alignment of the cylinders, each screw plug 28 is provided with a locating pin or shaft 52 arranged to fit loosely in a bore 54 in the abutment 50. The abutment is preferably constructed of concrete.

Figs. 1, 2 and 3 illustrate two driven shafts 56 and 58 which are arranged in spaced parallel relation at right angles to the longitudinal axes of the cylinders 10, 12 and 14. Shafts 56 and 58 are rotatably supported within bearings 60 carried by pedestals 62 mounted upon the floor or supporting structure indicated generally at 64. The pedestals 62 may be securely fastened to supporting structure 64 by bolts 66. Upon the shaft 56 I fixedly connect three sprockets 68 which are aligned with the power rods 18. Three similar sprockets 70 are fixedly connected with the shaft 58 and are aligned with the sprockets 68 to be operatively connected therewith through the medium of endless chains 72.

Chains 72 may be of conventional design but should include spaced shafts or pins 74. In Fig. 3, the rod 18 is provided with a threaded end 76 for connection with a turn buckle 78, which, in turn, has threaded connection with the rod 80 having a dog or claw 82 arranged to pass between two adjacent shafts 74 of the chain 72. The claw is provided with a slight concavity 84 which has pressure relation with the shaft 74 in the position 86 for moving the lower reach of the chain 72 in the direction of the arrow 88 in response to the expansive force of the freezing water in the associated cylinder.

In Fig. 3, the lower reach of the chain 72 is illustrated as having a slight degree of slack, which slack is sufficient to permit the lower reach to be raised sufficiently far to clear the claw 82, thus facilitating connection and disconnection. After placement of the claw as illustrated in Fig. 3, the concavity 84 is held in effective relation with the shaft 74 in the position 86 since the lower chain is restrained from dropping lower than the position illustrated because of the supporting relation between the rod 80 and the chain. The chains are so supported as to normally take the degree of slack illustrated in Fig. 3 but without resting on the rods 80. The supporting relation between the rods 80 and the chains is important only in the event of considerable wear in the chains, which might result in considerably more slack than that illustrated.

Any shifting of the pistons 16 within their respective cylinders causes power to be applied to the chains 72, which, in turn, rotates the shaft 58. Shaft 56 is operatively connected with a shaft 90 through the medium of a universal coupling 92 (see Fig. 1). Upon the shaft 90, I key a large gear 94 (see Fig. 4), which gear is arranged in mesh with a small pinion 96 keyed to a shaft 98. A large gear 100 is keyed to the shaft 98 and is in mesh with a small pinion 102 keyed to a shaft 104. A large gear 106 is keyed to the shaft 104 and is in mesh with a small pinion 108 keyed to the shaft 110. Upon the shaft 110 I key a large gear 112 which is arranged in mesh with a small pinion 114 keyed to the shaft 116. Shafts 90, 98, 104, 110 and 116 are rotatably supported by pedestals 118 (see Figs. 1 and 4). In Figs. 1 and 2, the shaft 116 is keyed to a sprocket 120. The air compressor 122 is provided with an operating sprocket 124 operatively connected with the sprocket 120 through the medium of a chain 126. Air compressor 122 may be of conventional design and may be connected with a suitable compresser air storage tank 128 through the medium of a conduit 130.

While the travel of the pistons 16 is limited to the degree of expansion of the freezing water, the gears illustrated in Fig. 4 are so proportioned as to function as a speed increaser so that slow travel of the pistons 16 is converted into high speed rotary movement of the shaft 116 which is operatively connected with the air compressor 122. The expansive force of freezing water is enormous so that the gear ratio of the speed increaser may be such as to convert relatively slow and limited movement of the pistons 16 into exceedingly high rotary motion of the shaft 116 which drives the air compressor, thus rendering the air compressor highly efficient.

In Fig. 3, I have indicated the approximate travel of the piston 16, which is from the full line position illustrated to the dotted line position 132. Shaft elements 74 are so spaced that the claw 82 travels a distance equal to two spaces between the adjacent shafts 74. The sprockets 68 and 70 are keyed to their respective shafts in the same relative positions so that the shaft elements 74 are axially aligned in the different chains 72. In this way, one claw 82 may be operatively connected with its respective chain 72 at the moment one of the other claws 82 reaches the termination of its travel. In operation, the cylinders may be charged individually and conveyed into their operating location against the abutment 50. When a given cylinder is properly located, the claw 82 associated therewith is connected with its respective chain 72. In view of the slight degree of slack in the chains, the lower reaches may be elevated to facilitate location of the claws in proper position with the pressure shaft 74 associated with that chain. In view of the limited travel of the piston 16, it is important that the claws 82 be rendered immediately effective on their respective chains 72 when the cylinders are placed in abutting relation with the abutment 50. To this end, Fig. 3 illustrates the rod 80 as being provided with a handle 134 which may be utilized to prevent rotation of the rod when the turn buckle 78 is adjusted for lengthening or shortening the effective reach of the rod 80. Thus, the claw 82 may be positioned between the adjacent shafts 74 and the turn buckle adjusted slightly to bring the claw into pressure relation with the shaft 74 in the position 86. The squared reach of the rod 18 prevents rotation thereof.

In Fig. 1, cylinder 10 has just been placed while cylinder 12 has expanded half its energy and cylinder 14 has performed its useful work and may be removed for recharging. While I have illustrated three cylinders, more or less may be employed. My invention is primarily designed for installation at high altitudes or in regions where the atmospheric temperature is such as to freeze the water. The system may be utilized for operating various types of machines. The compressed air storage tank 128 may be operatively connected with machinery to be operated. In an installation of this nature, the application of energy is not uniform, but in using the system for compressing air, a large reservoir of compressed air may be built up, which air will operate with a higher degree of uniformity than a direct connection between the system and machinery to be operated. The cylinders are so constructed as to withstand the enormous pressures incident to freezing of the liquid. In a cold region, a heated building may be employed for charging and unloading the cylinders while the trucks associated therewith facilitate transportation of the cylinders for such purposes.

In interposing a turn buckle in the connection between the chains and the pistons, I provide means whereby the claws 82 may be adjusted into pressure relation immediately upon placement of the cylinders or at the moment when expansion takes place in the cylinders. In this way, I render the expansive force of the freezing water immediately effective on the operated part. Should an expanded cylinder not be removed immediately upon complete expansion of its energy, the claw 82 associated therewith does not impede relative movement of that chain since each claw is provided with a cam surface 136 which causes the adjacent shaft 74 to climb easily. The pins or shafts 52 are preferably square in cross section so that a wrench may be applied thereto for removing the closure plugs 28. The ice in the cylinders may be easily and quickly removed. With the cylinder placed in a heated building, the ice loosens rapidly and expansion of the cylinder additionally frees the ice. For rapid removal, heat may be applied to the cylinder.

Figs. 5, 6 and 7 illustrate a slightly different form of cylinder structure in which four cylinders 138 are connected as a unit. The ends of the cylinders are positioned in recesses 140 in end plates 142, which plates are drawn into pressure relation with the cylinders through the medium of bolts 144. The pistons 146 which correspond to the pistons 16 are connected with rods 148, which, in turn, are fixedly connected with a head 150 connected with the rod 152 corresponding to the rod 18. The cylinders making up a unit are mounted upon a suitable truck 154. The construction of Figs. 5, 6 and 7 is of a faster freezing type, but in other respects the operation is the same and the units are the full equivalent of the cylinders previously described so far as the general arrangement within the set-up is concerned.

Without further elaboration, the foregoing will so fully explain my invention that others may, by applying current knowledge, readily adapt the same for use under various conditions of service.

I claim:

In a power generating system, an abutment, a pair of driven shafts rotatably journaled in a stationary support spaced from said abutment, sprockets on said shafts, a chain passing around said sprockets for driving the shafts in unison, one of said shafts constituting a power take-off, a cylinder for containing liquid to be frozen arranged in abutting relation with said abutment, a piston in said cylinder normally spaced from its ends to provide a liquid containing chamber and an expansion chamber for the piston, a push rod connected with the piston and having a claw for engaging links of the chain, and resilient means interposed between the piston and one end of the cylider for holding the piston in its normal position against the weight of the liquid, but yielding upon freezing of the liquid for moving the push rod.

MORRIS PLATZNER.